3,260,573
ZONE MELTING GALLIUM IN A RECYCLING ARSENIC ATMOSPHERE
Günther Ziegler, Erlangen, Germany, assignor to Siemens-Schuckertwerke Aktiengesellschaft, Berlin-Siemensstadt, Germany, a corporation of Germany
Filed June 26, 1963, Ser. No. 290,679
4 Claims. (Cl. 23—301)

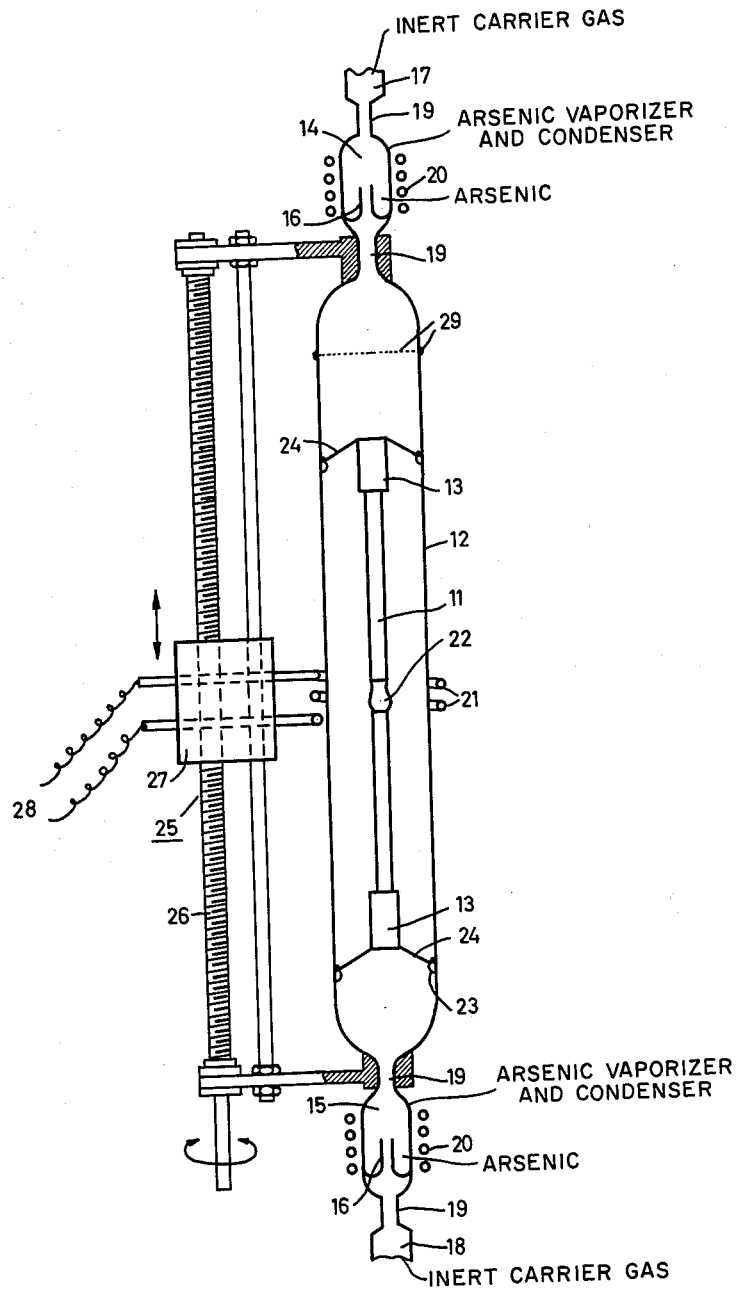

My invention relates to a method and apparatus for purifying semiconducting arsenides, preferably gallium arsenide, by zone melting.

The production of chemical elements in extreme purity has long since become of utmost importance in various arts, particularly with respect to semiconductor techniques, because extremely slight traces of impurities may greatly affect the physical properties of semiconductor bodies.

The attainment of extreme degrees of purity has become possible, inter alia, by the "zone-melting method" (W. G. Pfann, Journal of Metals, 1952, pages 747 to 753). According to this method, a rod-shaped body of the material to be purified is slowly traversed by a molten zone. The impurities contained in the material then travel with the molten zone toward one end of the rod. The method, originally performed with the aid of a crucible containing the material, can also be performed by crucible-free or "floating" zone melting techniques (P. H. Keck and M. G. E. Golay, Physical Review, vol. 89 (1954), page 1297; R. Emeis, Zeitschrift fur Naturf., vol. 9a (1954), page 67).

More recently, particularly after the discovery of semiconductor properties in compounds of the type $A^{III}B^V$ (H. Welker, U.S. Patent 2,798,989), the production of such chemical compounds in extreme degrees of purity has gained predominant importance. Attempts have been made to directly apply the zone-melting method to $A^{III}B^V$ semiconductor compounds. It has been found that this method can be applied to the high-boiling antimonides, for example InSb, GaSb, AlSb, substantially in a manner similar to the zone melting of elemental substances. Relative to the zone melting of the more readily vaporizable arsenides and phosphides, for example GaAs, InP, GaP, zone-melting methods have been developed that likewise secure satisfactory results (U.S. Patent 2,933,384).

It is an object of my invention to devise a further improved method and apparatus for extreme purification by zone melting of semiconducting arsenides such as InAs, AlAs and preferably GaAs, capable of securing the desired results in a particularly simple manner and with improved reliability.

According to my invention, the zone-melting process for purification of gallium arsenide, or similar semiconductor arsenides, is performed in a melting vessel which is not entirely closed and sealed but is provided with a gas inlet and outlet, the zone-melting operation being performed while a flow of protective gas is being passed through the vessel and along the arsenide rod being zone melted. Furthermore, the flow of protective gas passing along the rod is charged with arsenic vapor for maintaining the arsenic partial vapor pressure, which preferably corresponds to the partial pressure of arsenic over the GaAs at the melting point. According to another feature of my invention, the arsenic vapor is added to a protective gas, such as argon or nitrogen, as the gas enters into the processing space proper and is precipitated from the gas by cooling and resulting condensation as the gas leaves the processing vessel after having passed by the arsenide rod.

According to still another feature of my invention, a quantity of arsenic is vaporized at the entering location of the gas flow and recaptured by condensation at the gas exit of the processing vessel; and when the amount of arsenic at the entering side is nearly exhausted, the direction of the gas flow is reversed while continuing the unidirectional zone-melting passes, and now the previously condensed amount of arsenic is heated and vaporized, while the originally entering side of the vessel is cooled to recapture the arsenic by condensation.

The foregoing and more specific objects, advantages and features of my invention, said features being set forth with particularity in the claims annexed hereto, will be apparent from the following description in conjunction with the accompanying drawing which shows schematically an apparatus for purifying of GaAs according to the invention.

As illustrated, a rod 11 of gallium arsenide is mounted in a tubular processing vessel 12 consisting, for example, of quartz or quartz glass. The rod 11 is mounted in two holders 13 consisting, for example, of graphite. The two axial ends of the tubular vessel communicate with respective chamber structures 14 and 15 of which each communicates with a gas conduit or nipple 17 or 18 and communicates with the interior of the processing vessel 12 through a nozzle tube 19. Each of the chamber structures 14 and 15 contains in its interior a pocket-shaped container 16 for receiving the quantity of arsenic to be vaporized or precipitated. The walls of the chambers, or at least the internal surfaces thereof, consist of a material which is not decomposed at the temperatures and other conditions occurring in the process. If the material tends to give off minute traces of substance, then such traces must consist of elements that do not have a doping effect upon the arsenide being processed. A material well suitable for the chamber structures 14, 15 or the inner wall surfaces thereof is a tubular structure of boron nitride (BN).

The entire apparatus shown is kept within a high-temperature zone of about 700° C. during performance of the zone-melting operations. The two chamber structures 14 and 15 are provided with temperature control devices 20 which consist of tubular helical coils so that they may serve as heating windings or cooling coils respectively. An induction winding 21 surrounds the tubular vessel 21 and, when traversed by high-frequency current causes a narrow zone 22 of the gallium arsenide rod 11 to be heated to the melting temperature. The heater coil 21 is slowly movable longitudinally of the vessel 11 in order to pass the molten zone 22 longitudinally through the rod. For zone-melting operations, any desired number of zone passes can be performed in a given direction, the return travel being effected when the coil 21 is deenergized or kept at a lower temperature. The total length of the processing vessel 12 is approximately 30 cm.

For maintaining the As partial vapor pressure during the method according to the invention, an amount of arsenic in chamber 14 is caused to vaporize by means of the heating device 20 around chamber 14 at about 900° C. A flow of protective gas, for example argon, is passed through inlet 17, chamber 14 and thence through the nozzle tube 19 into the processing space within the vessel 12. The arsenic being vaporized from the pocket 16 in chamber 14, is entrained by the gas flow and passes together therewith through the interior of the vessel 13 and into the chamber 15. The chamber 15 is simultaneously maintained at a temperature of about 600° C. This is done by cooling, namely by passing water through the tubular coil 20 surrounding chamber 15. The arsenic, contained in vaporous form in the flow of gas, then precipitates in the chamber 15 and is collected in the pocket 16 of that chamber.

The flow rate of the protective gas is kept for example at about 5 mm. per minute. As a result, the arsenic partial vapor pressure within the melting vessel 12 is maintained at a pressure of approximately 1 atmosphere. The melting zone 22 is pulled lengthwise through the gallium arsenide rod 11 at a rate of about 0.2 to 20 mm. per minute. The substances that escape out of the molten zone in the gallium arsenide rod and that are more volatile than arsenic are torn away by the gas flow and escape through the gas duct or nipple 18 out of the melting vessel.

When the arsenic in chamber 14 is substantially exhausted, the gas flow direction is reversed. That is, the gas flow is now passed at 18 into the vessel. The arsenic previously precipitated into the pocket 16 of chamber 15 is now heated by passing electric current through the coil 20 surrounding chamber 15. The temperature thus supplied is about 900° C. and causes the arsenic to vaporize. At the same time the upper coil 20 is now cooled to a temperature of about 600° C. so that arsenic will condense and precipitate into the pocket 16 of the upper chamber 14. The above-described operation now takes place in the opposite direction. The process can thus be alternated more than once with respect to the gas flow direction, up to the desired purity degree of the GaAs.

It is an essential advantage of the method of the invention that an exchange reaction via the gaseous phase can no longer counteract or subsequently eliminate the effect of the purification effected by the zone-melting operation; and it is also an advantage of the invention that is can be applied for purification of all arsenides of the $A^{III}B^{V}$ compounds.

In the illustrated apparatus, the tubular vessel 12 is provided with internal bosses 23 of the vessel material on which respective spider legs 24 are supported. The legs 24, consisting of quartz or graphite, are fastened to the rod holders 13. When the vessel is opened at 29, the assembly composed of the spiders and holders with the rod 11 can be inserted from above until the spiders rest upon the bosses. Thereafter the vessel is sealed, for example by fusing its parts together at 29, although a conical ground fit may also be provided between the two vessel portions to simplify sealing and reopening. The induction heater coil 21 is mounted on a guide block 27 of a transport device 25 whose driven feed spindle 26 is in threaded engagement with the block. High-frequency current is supplied to the coil 21 through leads 28.

To those skilled in the art it will be obvious upon a study of this disclosure, that my invention permits of various modifications, particularly with respect to details of the apparatus employed, and thus can be given embodiments other than particularly illustrated and described herein, without departing from the essential features of my invention and within the scope of the claims annexed hereto.

I claim:

1. The method of purifying semiconductor arsenides by zone melting, which comprises subjecting an arsenide rod to floating zone melting in a vessel, passing during zone melting a current of inert carrier gas through the vessel and past the molten zone, and charging the carrier gas current ahead of the molten zone with arsenic vapor to an arsenic partial pressure corresponding substantially to the arsenic partial pressure obtaining above the arsenide at the melting temperature by passing the incoming carrier gas continuously thru the arsenic vapor source, and following the passage of the carrier gas over the melting zone, condensing the arsenic from the carrier gas in a cooling zone.

2. The method of purifying semiconductor arsenides by zone melting, which comprises subjecting an arsenide rod to floating zone melting in a vessel, passing during zone melting an inert carrier gas from one end of the vessel to the other end along the rod being zone melted, vaporizing arsenic at said one end of the vessel by heating arsenic in an intitial heating zone provided at one end of the vessel, introducing the inert carrier gas into the end of the vessel by passing it centrally thru the initial heating zone thereby charging the inert carrier gas with arsenic vapor to an arsenic partial pressure substantially equal to the arsenic partial pressure in the molten zone of the arsenide rod, and cooling and thereby precipitating arsenic from the gas flow at the other end of the vessel in an initial cooling zone.

3. The method as defined in claim 3, wherein the direction of flow of the inert carrier gas is reversed while continuing the zone melting comprising the steps of heating the arsenic precipitated in the initial cooling zone, passing the inert carrier gas into the other end of the vessel by passing it thru the now heated initial cooling zone, and cooling and thereby precipitating arsenic from the gas flow at the one end of the vessel in the initial heating zone which is now being cooled.

4. The method of purifying gallium arsenide, which comprises subjecting a rod of gallium arsenide to unidirectional zone-melting passes in a vessel having two openings spaced substantially past the opposite ends of and in alignment with the rod, simultaneously passing a flow of inert carrier gas from an outside source through an arsenic vaporization chamber and into the column thru one of said openings in said vessel along the rod, out thru the opening at the opposite end of the vessel to a cooling chamber to precipitate the arsenic vapor from the inert carrier gas, to the other opening and through a condensing chamber, heating and thereby vaporizing arsenic in said vaporization chamber for charging the gas flow with arsenic vapor, and maintaining the cooling chamber at condensing temperature for precipitating arsenic out of the gas flow.

References Cited by the Examiner

UNITED STATES PATENTS 3,077,384    2/1963    Enk et al. _____ 23—204

OTHER REFERENCES

Cunnell et al. (II): Solid-State Electronics, vol. 1, pp. 97–106, Pergamon Press, 1960, Great Britain.

Cunnell et al.: Journal of Sci. Ins., vol. 37, November 1960, pp. 410–414.

Jannay Semiconductors, Reinhold Pub. Corp., Feb. 27, 1959, pp. 121–123, 411–413.

Keck et al.: Review of Sci. Ins., vol. 25, #4, April 1954, pp. 331 to 334.

Lawson et al.: Preparation of Single Crystals, Butterworth, London, 1958, pp. 89 to 91, 131–133.

NORMAN YUDKOFF, *Primary Examiner.*

GEORGE D. MITCHELL, *Examiner.*

S. J. EMERY, A. J. ADAMCIK, *Assistant Examiners.*